United States Patent [19]
Arnold

[11] Patent Number: 5,937,650
[45] Date of Patent: Aug. 17, 1999

[54] EXHAUST GAS RECIRCULATION SYSTEM EMPLOYING A TURBOCHARGER INCORPORATING AN INTEGRAL PUMP, A CONTROL VALVE AND A MIXER

[75] Inventor: Steven Don Arnold, Rancho Palos Verdes, Calif.

[73] Assignee: AlliedSignal Inc., Morristown, N.J.

[21] Appl. No.: 09/032,101

[22] Filed: Feb. 27, 1998

Related U.S. Application Data

[60] Provisional application No. 60/039,246, Mar. 3, 1997.
[51] Int. Cl.⁶ .................................................... F02M 25/07
[52] U.S. Cl. ............................................................ 60/605.2
[58] Field of Search ............................................ 60/605.2

[56] References Cited

U.S. PATENT DOCUMENTS

| | | |
|---|---|---|
| 4,231,225 | 11/1980 | Aya . |
| 4,250,711 | 2/1981 | Zehnder . |
| 4,426,848 | 1/1984 | Stachowicz ............................. 60/605.2 |
| 5,406,796 | 4/1995 | Hiereth et al. ......................... 60/605.2 |

FOREIGN PATENT DOCUMENTS

| | | |
|---|---|---|
| 0620365A1 | 10/1994 | European Pat. Off. . |
| 0 740 065 A1 | 10/1996 | European Pat. Off. . |
| 4209469 | 4/1993 | Germany .............................. 60/605.2 |
| 42 31 218 C1 | 9/1993 | Germany . |
| 4235784C1 | 10/1993 | Germany . |
| 3-37318 | 2/1991 | Japan ..................................... 60/605.2 |
| 5-71426 | 3/1993 | Japan . |
| WO 94/29587 | 12/1994 | WIPO . |
| WO 96/18030 | 6/1996 | WIPO . |

*Primary Examiner*—Michael Koczo
*Attorney, Agent, or Firm*—Felix L. Fischer

[57] ABSTRACT

An Exhaust Gas Recirculation system for an internal combustion engine incorporates a turbocharger having a compressor rotor with two sets of vanes on opposite sides of the rotor disk for compression of charge air and recirculated exhaust gas. The charge air and recirculated exhaust gas streams are segregated in the turbocharger and an inlet and an outlet volute for the recirculated exhaust gas is integral with the turbocharger center housing. A mixer receives the charge air downstream of the charge air cooler and mixes the recirculated exhaust gas for input into the intake manifold. A variable valve intermediate the exhaust manifold of the engine and the inlet of the turbocharger EGR inlet volute controls the amount of recirculation.

10 Claims, 6 Drawing Sheets

1

EXHAUST GAS RECIRCULATION SYSTEM EMPLOYING A TURBOCHARGER INCORPORATING AN INTEGRAL PUMP, A CONTROL VALVE AND A MIXER

CROSS REFERENCE TO RELATED APPLICATIONS

This application claims the benefit of the filing date of provisional application Ser. No. 60/039,246 having a filing date of Mar. 3, 1997 entitled Exhaust Gas Recirculation System Employing A Turbocharger Incorporating An Integral Pump, A Control Valve And A Mixer.

BACKGROUND OF THE INVENTION

1. Field of the Invention

The present invention is related generally to the field of internal combustion engine exhaust gas recirculation (EGR) for emissions improvement. More particularly, the invention provides a turbocharger compressor wheel having impeller vanes mounted on a side opposite the compressor impeller to act as an EGR pump with a separate diffuser and volute for EGR flow output from the pump and a separate scroll inlet to the EGR pump; a control valve for metering exhaust gas to be recirculated and a mixer for entraining the recirculated exhaust gas in the charge air for the engine.

2. Description of the Related Art

EGR is a known method for reducing the NOX emissions in internal combustion engines. For effective use, an EGR system must overcome the adverse pressure gradient created by a positive pressure gradient across the engine which is typical of modern high efficiency diesel engines in at least a portion of their operating range. Various approaches to implementing EGR have included pumping of a portion of the exhaust gas from the exhaust manifold to the intake manifold. Pumping has been accomplished by introducing the exhaust gas into the compression inlet of a conventional turbocharger or supercharger present on the engine or, alternatively, providing a separate compressor receiving the exhaust gas and pressurizing it to a suitable pressure for insertion into the charge air downstream of the charge air boosting system on the engine. Some fuel consumption penalty is generally incurred by these systems.

EGR also requires adequate mixing of recirculated exhaust gas with the incoming fresh air charge to avoid performance degradation and to minimize mixing losses to avoid additional fuel consumption penalties. Further, positive control of the recirculated exhaust gas flow is required to assure proper proportions in the charge air mixture supplied to the engine intake manifold under varying operating conditions. Additionally, the components and features of an EGR system must be accommodated within the constraints of limited volume available for allocation in modern engine compartments.

It is, therefore, desirable to provide a highly integrated EGR system employing pumping components for recirculation of exhaust gas in close physical and functional cooperation with existing engine system components such as turbochargers. It is further desirable to configure an EGR flow path and provide novel control components to allow necessary control over exhaust gas flow rates and mixing into the charge air for aspiration by the engine to minimize variation of the percentage of exhaust gas from cylinder to cylinder.

SUMMARY OF THE INVENTION

An EGR system for an internal combustion engine is comprised of a turbocharger having a turbine housing including an exhaust gas inlet and a turbine outlet which houses a turbine driven by exhaust gas received through the exhaust gas inlet and connected to a rotatable shaft. A center housing supporting a bearing assembly which receives the rotatable shaft, is connected to turbine housing and a compressor housing having an air inlet and a charge air outlet. A compressor rotor is attached to the rotatable shaft, the rotor having a first vane set receiving air through the compressor housing inlet and discharging compressed air to the charge air outlet. The rotor has a second vane set integrally mounted on the rotor opposite the first vane set which receives exhaust gas from an EGR inlet and discharges compressed exhaust gas through a diffuser to an exhaust gas outlet. The exhaust gas outlet and charge air outlet are separate flow paths. A baffle segregating the flow paths at the rotor circumference separates the flow paths of the exhaust gas and charge air.

A mixer is positioned downstream of the turbocharger which receives the exhaust gas and the charge air and passes the mixed charge through an outlet connected to the intake manifold of the engine. A control valve is provided intermediate the engine exhaust manifold and the EGR inlet to control the amount of exhaust gas recirculated to the second vane set in the turbocharger. Appropriate conduits connect the exhaust gas outlet to the mixer and the charge air outlet to the mixer.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
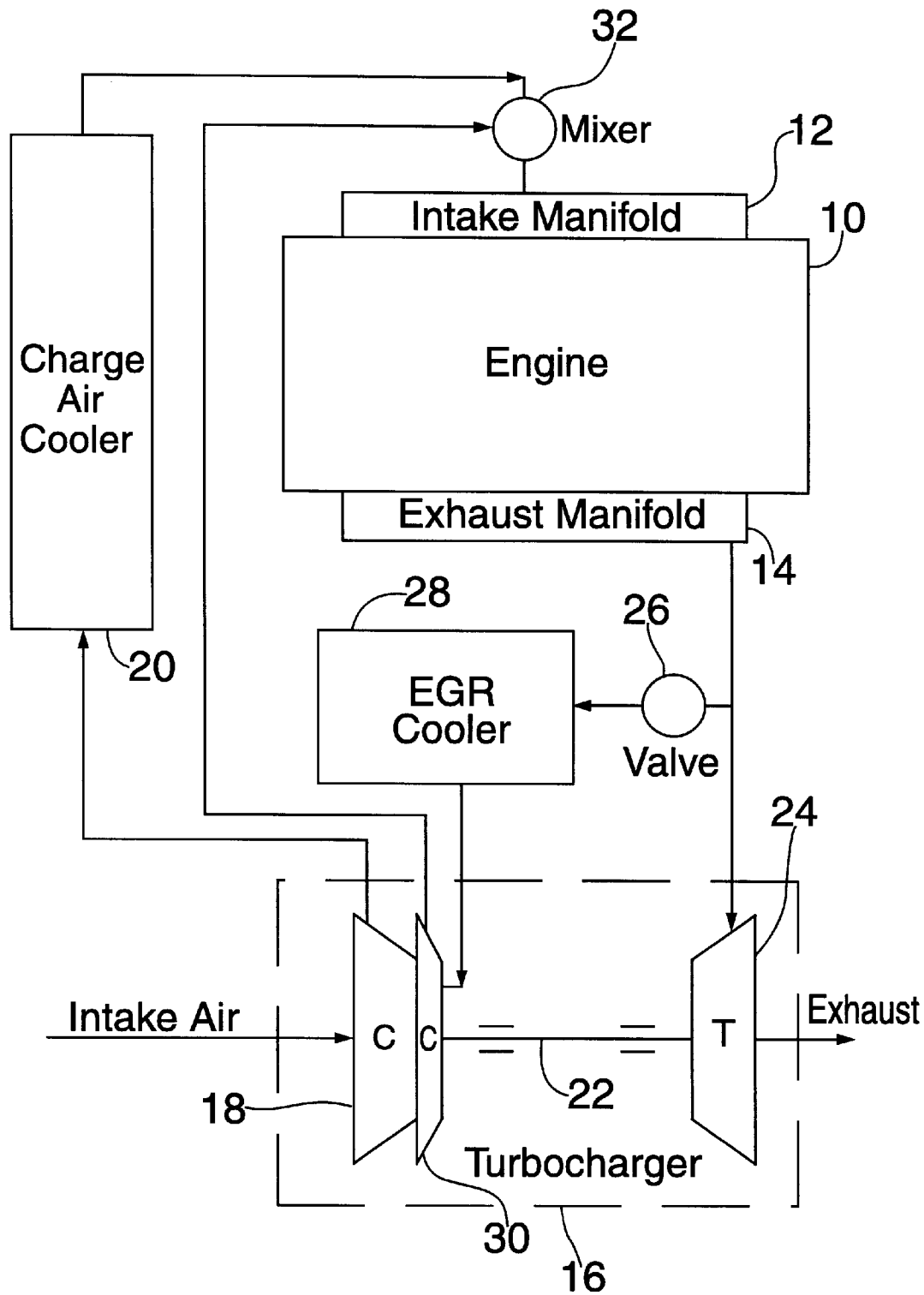
FIG. 1. is a schematic diagram of an engine and EGR system employing the combination and components of the present invention.

Referring to the drawings, FIG. 1 shows an internal combustion engine 10 having an intake manifold 12 and an exhaust manifold 14. A turbocharger 16 is provided for charge air boost, receiving intake air for compression by a compressor rotor 18 which provides the pressurized air to a charge air cooler 20 prior to introduction into the intake manifold. The compressor rotor is driven by a shaft 22 connected to a turbine 24 receiving exhaust gas from the exhaust manifold of the engine.

Exhaust gas for recirculation is diverted from the flow out of the exhaust manifold through a control valve 26 to an EGR cooler 28. Gas from the EGR cooler is provided to the inlet of an EGR pump which, for the embodiment shown in the drawings, is a compressor rotor 30 mounted to the turbocharger shaft to be driven by the turbine. The pressurized exhaust gas from the EGR pump flows to a mixer 32 which combines the recirculated exhaust flow with the charge air to create a substantially homogenous flow stream for introduction into the intake manifold.

Figure 2:
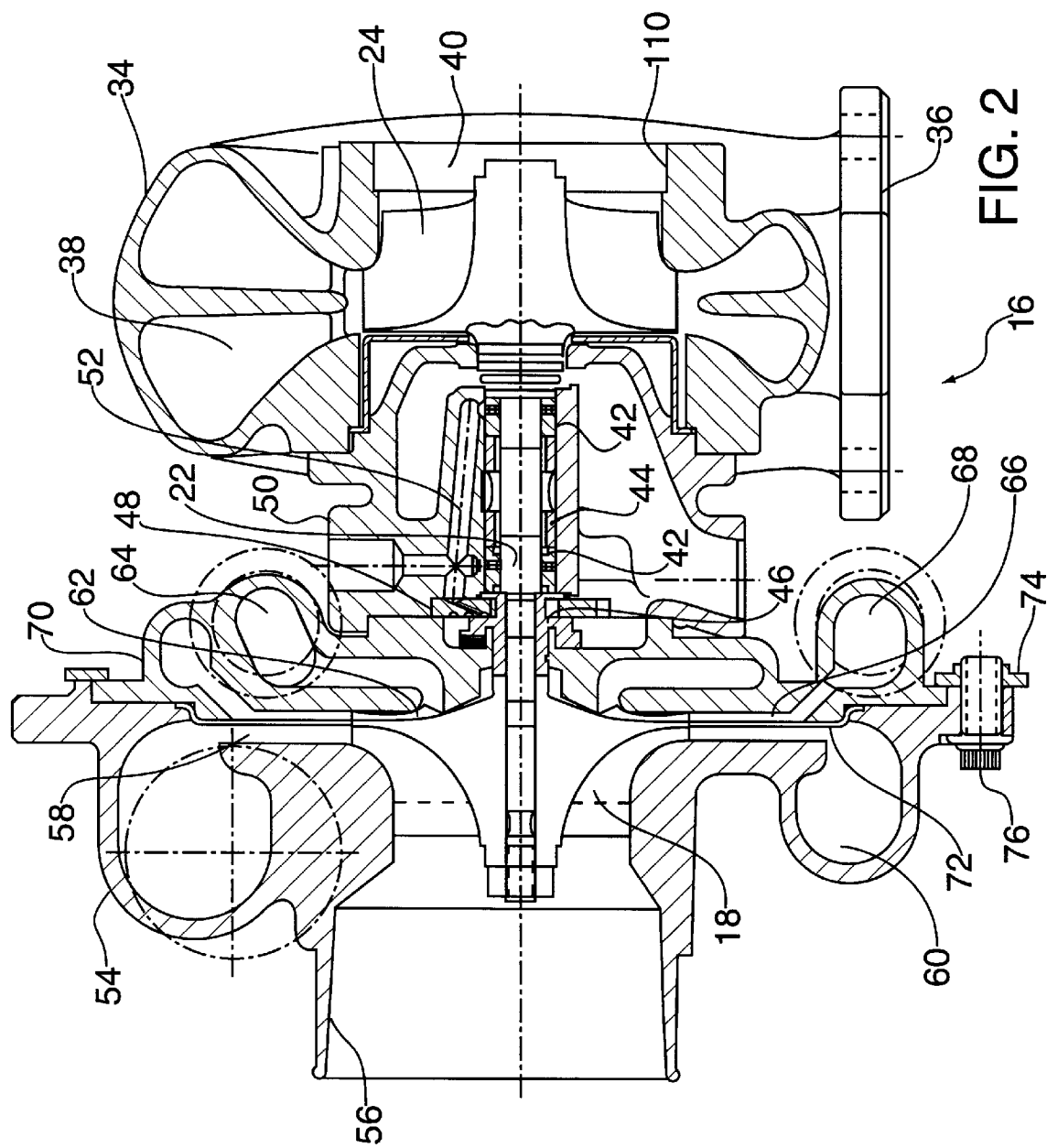
FIG. 2 is a detailed section view of an EGR pump employed in an embodiment of the invention which is integral with a turbocharger.

FIG. 2 shows the details of a turbocharger employing an integral EGR compressor according to the present invention. The turbine is contained in a cast turbine housing 34 which incorporates a radial exhaust gas inlet 36 feeding a bifurcated volute 38, for the embodiment shown in the drawings. Gas flowing through the turbine exits at turbine outlet 40. Shaft 22 is supported by a bearing system including journal bearings 42 separated by spacer 44 and thrust collar 46 with bearing 48 all carried within a center housing 50 which incorporates lubrication channels 52. The charge air compressor is contained within a cast compressor housing 54 which provides an air inlet 56, a diffuser 58 and a volute 60 for the compressed charge air.

The EGR pump is incorporated into the existing rotor group of the turbocharger by adding impeller vanes 62 to the back side of the compressor wheel. A scroll inlet 64 provides exhaust gas for recirculation and a separate diffuser 66 carries the pressurized exhaust gas to a volute 68. The EGR pump inlet, diffuser and volute are incorporated in a casting 70 which replaces the conventional compressor back plate for the turbocharger, thereby requiring only a small increase in the length of the rotor group and turbocharger as a whole. Segregation of the charge air flow in the compressor and the recirculated exhaust gas in the EGR pump is maintained by a baffle 72 which is constrained between the compressor housing and EGR pump casting. The baffle engages the rotor circumference in a step seal or centrifugal seal. Alternative embodiments employ a scroll seal to create a pressure differential separating the EGR flow and charge air flow in the turbocharger to avoid fouling of the charge air flow components such as the charge air cooler downstream of the turbocharger which will be described in greater detail subsequently. The EGR pump casting is mounted to the compressor housing using a retaining ring 74 and bolts 76 received in the compressor housing.

Figure 3:
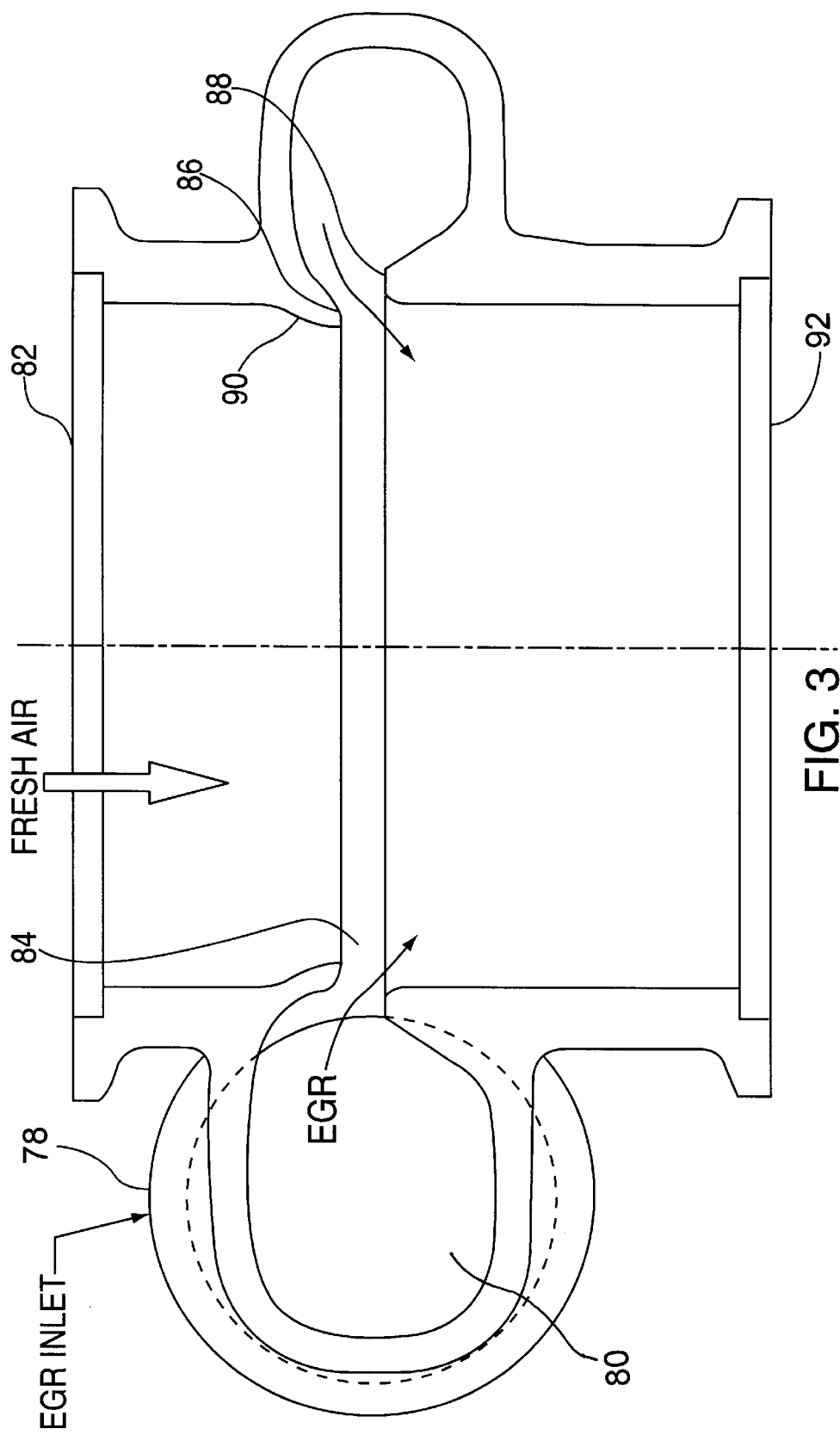
FIG. 3 is a detailed section view of a mixer for recirculated exhaust gas from the EGR pump and fresh charge air from the turbocharger compressor incorporated in the disclosed embodiment of the present invention.

Pressurized exhaust gas from the EGR pump and pressurized charge air from the turbocharger compressor and charge air cooler are combined in mixer 32 which is shown in detail in FIG. 3. Exhaust gas from the pump is introduced to the mixer through an inlet 78 to a volute 80 circumferentially distributed about the main fresh air flow path entering through inlet 82 from the charge air cooler. The volute introduces the exhaust gas uniformly about the circumference of the fresh air flow path through slot 84 which has a tailored upstream lip 86 of relatively smaller diameter and a downstream lip 88 of relatively larger diameter to produce a three dimensional angle for the EGR flow to promote both penetration into the core flow stream and a swirl to further mix the flow downstream.

The inner wall 90 of the fresh air flow passage is shaped to provide a convergent/divergent nozzle effect which increases the velocity of the fresh air charge, reduces the static pressure of the flow and enhances the entrainment of EGR into the fresh air charge. The mixed flow exits through outlet 92.

Figure 6:
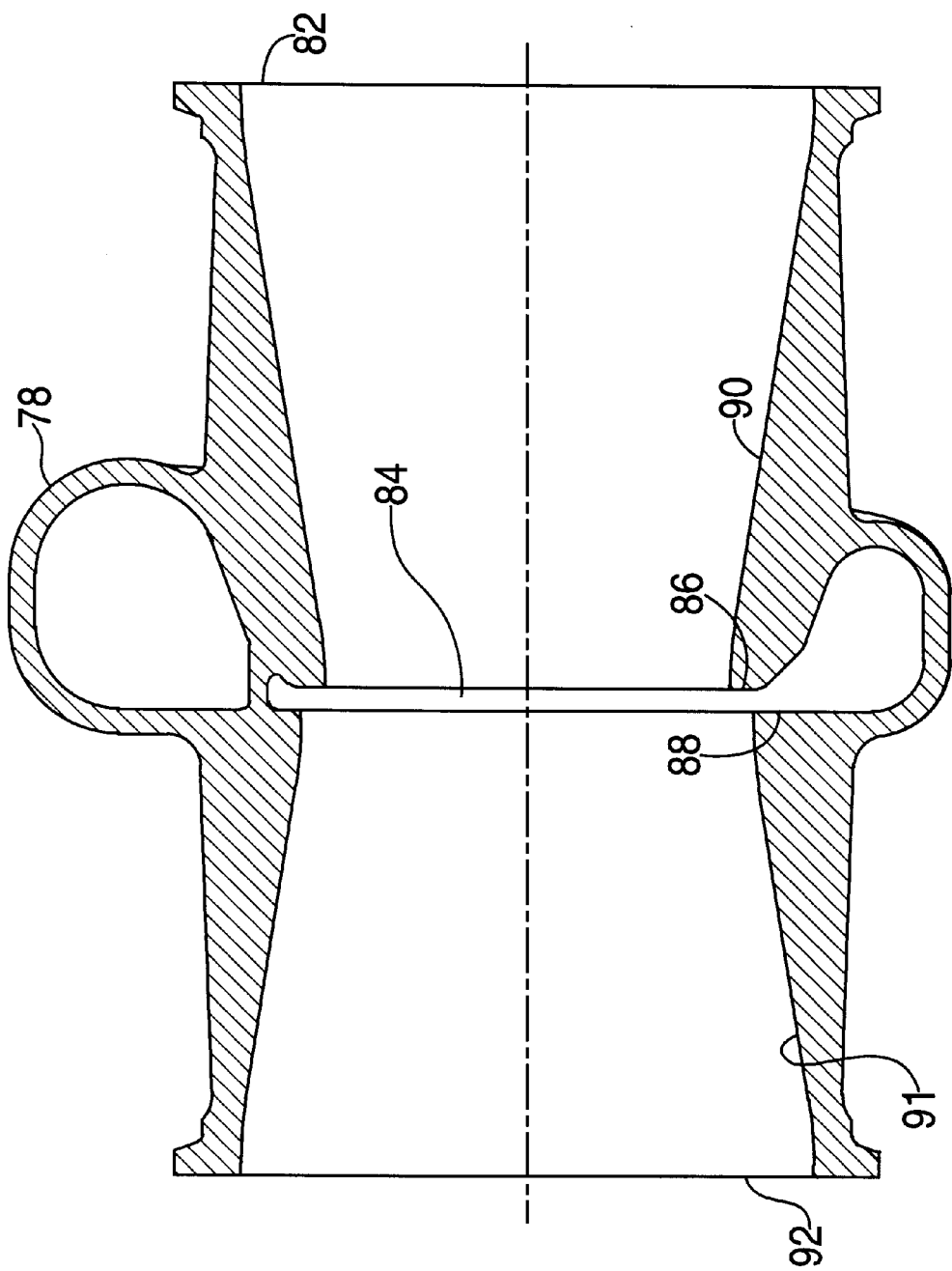
FIG. 6 is a detailed section view of a second embodiment of the mixer of FIG. 3.

A second embodiment of the mixer is shown in FIG. 6 which incorporates a diverging nozzle section 91 to further enhance mixing of the EGR and fresh air charge and enhance velocity matching in the flow.

FIG. 1 shows the mixer as a separate component placed near the intake manifold inlet. However, placement of the mixer varies in alternative embodiments and where an EGR cooler is employed, the mixer is located near or integrated into the charge air cooler outlet or as a cast or machined portion of the intake manifold of the engine. In applications where an EGR cooler is not employed, the mixer is located near or incorporated as an integral portion of the compressor housing outlet or the charge air cooler inlet.

Figure 4:
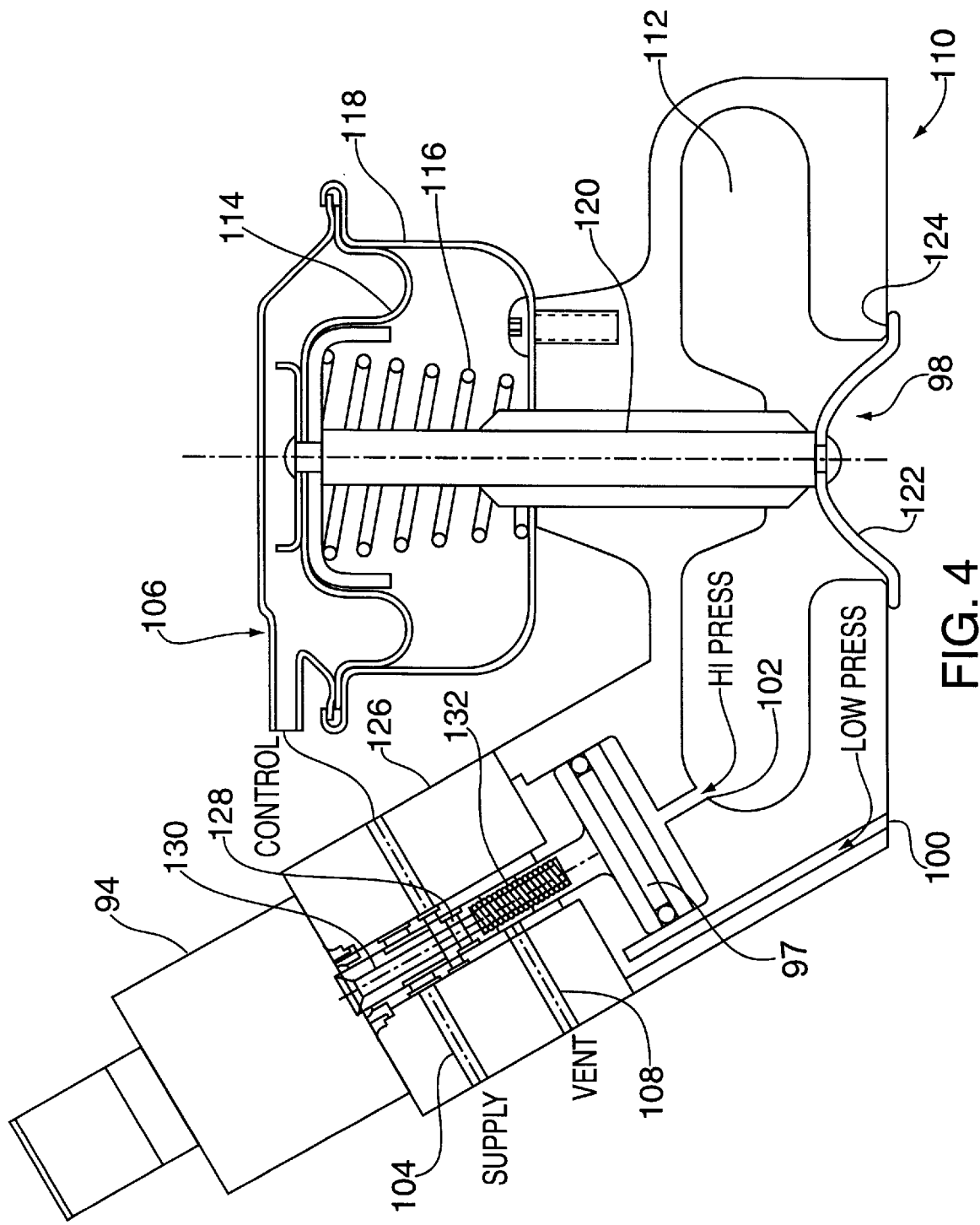
FIG. 4. is a detailed section view of a valve used in the embodiment of the invention shown in the drawings for control of exhaust gas to be recirculated.
Figure 5:
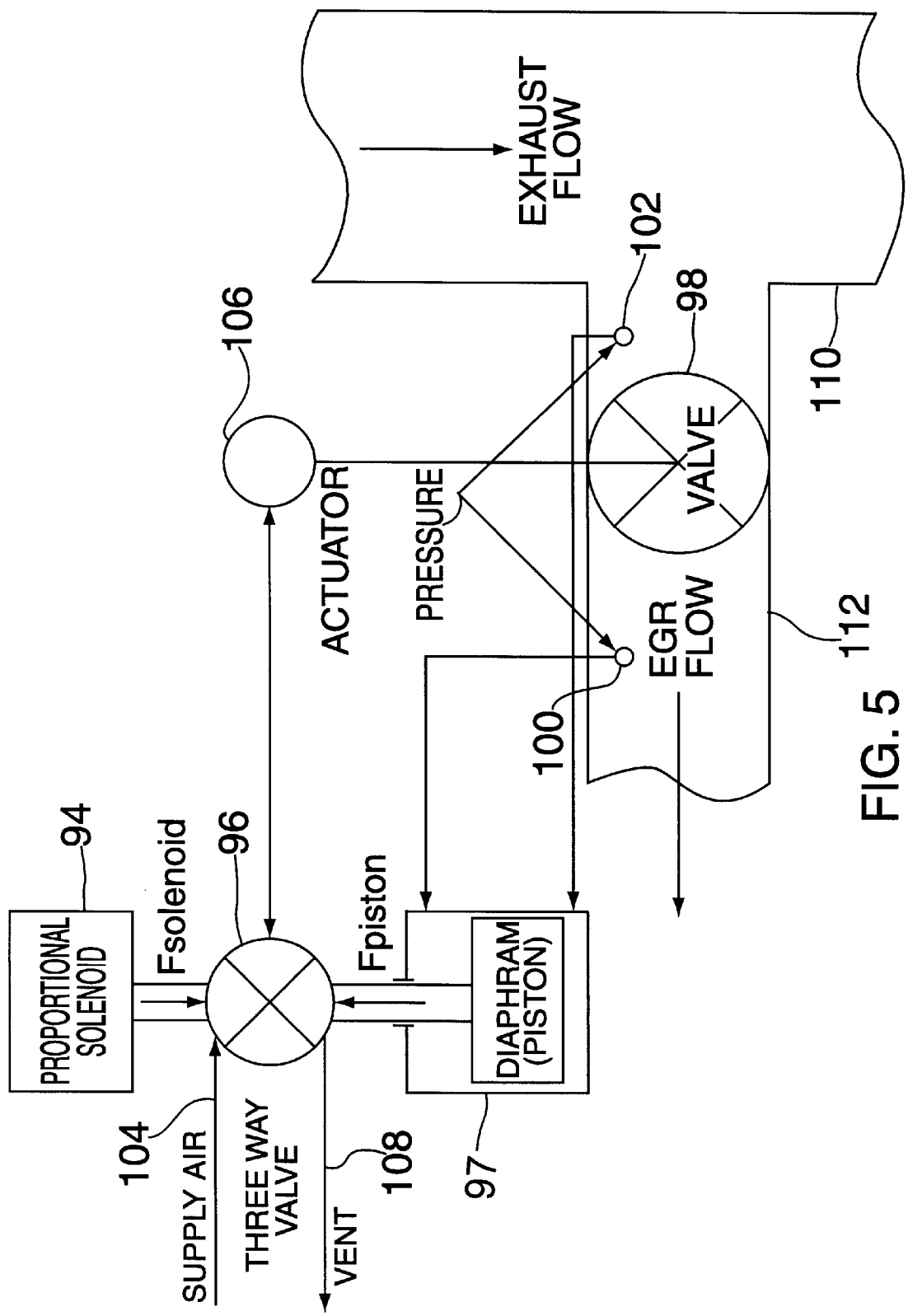
FIG. 5 is a schematic diagram of the operation and elements of the valve of FIG. 4.

Exhaust gas for recirculation is provided to the EGR pump through control valve 26. FIGS. 4 and 5 describe the mechanical configuration and operation of one embodiment of the valve. A proportional electrical solenoid 94 acts on a three-way pneumatic or hydraulic valve 96 with opposing force provided by a piston or diaphragm 97 which is, in turn, acted on by a differential pressure generated by the flow through a separate exhaust gas recirculation valve 98. The differential pressure is sensed through ports 100 and 102. The three way valve provides supply air from line 104 to an actuator 106 for the EGR valve or vents actuator air through vent 108. When the electrical solenoid force is exactly balanced by the force of the piston, no flow occurs to or from the EGR valve actuator. When the force of the piston is not sufficient to balance the force of the solenoid, the three-way valve opens to supply air to the actuator, thus increasing the EGR flow from the primary exhaust flow line 110 through the EGR valve into the EGR flow line 112 and thus increasing the differential pressure across the valve, restoring the balance of forces. Conversely, when the force of the piston is greater than the force of the solenoid, the three-way valve opens to vent air from the EGR valve actuator, thus decreasing the EGR flow and the differential pressure across the valve, again restoring the balance of forces. As shown in FIG. 4, the EGR valve actuator, for the embodiment shown in the drawings, employs a diaphragm 114 and spring 116 enclosed in a pressure case 118, which position a shaft 120 for controlling valve poppet 122 on seat 124 to meter EGR flow. The three way valve employs a multi port body 126 incorporating the supply and vent lines with a movable orifice 128 supported on a shaft 130 engaging the solenoid and piston. A centering spring 132 balances reaction forces of the solenoid and pressure piston.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. A turbocharger incorporating an integral Exhaust Gas Recirculation (EGR) pump comprising:

a turbine housing including an exhaust gas inlet and a turbine outlet;

a turbine driven by exhaust gas received through the exhaust gas inlet and connected to a rotatable shaft;

a center housing supporting a bearing assembly which receives the rotatable shaft, the center housing including means for connection to the turbine housing;

a compressor housing having an air inlet and a charge air outlet;

a compressor rotor attached to the rotatable shaft, the rotor having a first vane set receiving air through the compressor housing inlet and discharging compressed air to the charge air outlet, the rotor having a second vane set integrally mounted on the rotor opposite the first vane set and receiving exhaust gas from an EGR inlet and discharging compressed exhaust gas through a diffuser to an exhaust gas outlet, the exhaust gas outlet and charge air outlet comprising separate flow paths;

means for segregating the flow paths at the rotor circumference to separate the flow paths of the exhaust gas and charge air;

means for attaching the exhaust gas outlet to a mixer; and means for attaching the charge air outlet to the mixer.

2. A turbocharger as defined in claim 1 wherein the EGR inlet and exhaust gas outlet are incorporated as a casting mounted intermediate the compressor housing and the turbine housing.

3. A turbocharger as defined in claim 2 wherein the casting incorporates a backplate for the compressor rotor and further includes means for mounting the casting to the center housing and means for mounting the compressor housing to the casting.

4. A turbocharger as defined in claim 1 wherein the compressed exhaust outlet comprises a volute terminating in an outlet port.

5. A turbocharger as defined in claim 1 wherein the EGR inlet is a volute terminating in a substantially cylindrical channel.

6. A turbocharger as defined in claim 1 wherein the segregation means comprises a baffle extending from the compressor housing to the rotor circumference.

7. An EGR system for an internal combustion engine comprising:

a turbocharger having a turbine housing including an exhaust gas inlet and a turbine outlet;

a turbine driven by exhaust gas received through the exhaust gas inlet and connected to a rotatable shaft;

a center housing supporting a bearing assembly which receives the rotatable shaft, the center housing including means for connection to the turbine housing;

a compressor housing having an air inlet and a charge air outlet;

a compressor rotor attached to the rotatable shaft, the rotor having a first vane set receiving air through the compressor housing inlet and discharging compressed air to the charge air outlet, the rotor having a second vane set integrally mounted on the rotor opposite the first vane set and receiving exhaust gas from an EGR inlet and discharging compressed exhaust gas through a diffuser to an exhaust gas outlet, the exhaust gas outlet and charge air outlet comprising separate flow paths;

means for segregating the flow paths at the rotor circumference to separate the flow paths of the exhaust gas and charge air;

a mixer downstream of the turbocharger which receives the exhaust gas and the charge air, said mixer having an outlet;

a control valve intermediate an exhaust manifold and the EGR inlet to control the amount of exhaust gas recirculated to the second vane set in the turbocharger;

means for attaching the exhaust gas outlet to the mixer;

means for attaching the charge air outlet to the mixer; and means for attaching the mixer outlet to an inlet manifold for the engine.

8. An EGR system for an internal combustion engine as defined in claim 7 further comprising an EGR cooler intermediate the control valve and the EGR inlet to the turbocharger.

9. An EGR system for an internal combustion engine as defined in claim 7 further comprising a charge air cooler intermediate the charge air outlet of the turbocharger and the mixer.

10. An EGR system for an internal combustion engine as defined in claim 7 wherein the EGR inlet and exhaust gas outlet are incorporated as a casting mounted intermediate the compressor housing and the turbine housing.

\* \* \* \* \*